United States Patent
Voltz et al.

(10) Patent No.: US 6,670,994 B2
(45) Date of Patent: Dec. 30, 2003

(54) METHOD AND APPARATUS FOR DISPLAY OF INTERLACED IMAGES ON NON-INTERLACED DISPLAY

(75) Inventors: Christopher Voltz, Houston, TX (US); Drew S. Johnson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/320,107

(22) Filed: Dec. 16, 2002

(65) Prior Publication Data

US 2003/0086016 A1 May 8, 2003

Related U.S. Application Data

(63) Continuation of application No. 09/611,025, filed on Jul. 6, 2000, now Pat. No. 6,504,577, which is a continuation of application No. 08/827,977, filed on Apr. 1, 1997, now Pat. No. 6,166,772.

(51) Int. Cl.$^7$ ............................................... H04N 7/016
(52) U.S. Cl. ....................................... 348/448; 348/443
(58) Field of Search .................................. 348/448, 443, 348/446, 445, 447, 456, 458, 459, 441, 552, 715, 911; 386/131

(56) References Cited

U.S. PATENT DOCUMENTS

| | | | | |
|---|---|---|---|---|
| 4,603,350 A | * | 7/1986 | Arbeiter et al. | 348/448 |
| 4,605,962 A | * | 8/1986 | Christopher et al. | 348/448 |
| 4,641,188 A | * | 2/1987 | Dischert | 348/448 |
| 5,406,311 A | * | 4/1995 | Michelson | 345/547 |
| 5,488,389 A | * | 1/1996 | Nakanishi et al. | 345/670 |
| 5,497,199 A | * | 3/1996 | Asada et al. | 348/446 |
| 5,781,241 A | * | 7/1998 | Donovan | 348/441 |
| 5,796,439 A | * | 8/1998 | Hewett et al. | 348/459 |
| 6,040,868 A | * | 3/2000 | Jun | 348/448 |
| 6,144,410 A | * | 11/2000 | Kikuchi et al. | 348/441 |

* cited by examiner

Primary Examiner—Michael H. Lee
Assistant Examiner—Jean W. Désir

(57) ABSTRACT

A home entertainment appliance includes a computer system and a television system. A video monitor or television monitor of the home entertainment system shows a sequence of video frames generated in the appliance based upon at least one received sequence of interlaced video fields each containing a number of scan lines. A video system of the appliance receives a first field, temporarily stores the first field in an input buffer, and then in a loop, while video fields are being received, performs various other steps. The other steps include receiving a next field, compensating the field in the input buffer, deinterlacing the received field with the compensated field in the input buffer, temporarily storing the received field, merging the received field and the compensated field into a video frame of the second sequence, and providing the video frame of the second sequence to a subsequent device. Compensating, when performed, may be accomplished by shifting the position of one of the fields downward with respect to the field as it is received, or may be accomplished by delaying the field until the next field is received.

23 Claims, 11 Drawing Sheets

METHOD AND APPARATUS FOR DISPLAY OF INTERLACED IMAGES ON NON-INTERLACED DISPLAY

CROSS-REFERENCE TO RELATED APPLICATIONS

This application, is a continuation of application Ser. No. 09/611,025, filed Jul. 6, 2000, now U.S. Pat. No. 6,504,577, issued Jan. 7, 2003. which is a continuation of U.S. application Ser. No. 08/827,977, filed Apr. 1, 1997, now U.S. Pat. No. 6,166,772, issued Dec. 26, 2000, which are incorporated herein in their entirety by reference.

BACKGROUND OF THE INVENTION

Description of the Related Art

The home entertainment industry is one of the fastest growing areas of the world economy. Direct Satellite Service television, the explosive growth of cable television channels, video on demand, and a host of other services have changed the ordinary television set into a home entertainment center, opening the door to an enormous amount of variety and options. Furthermore, the Internet, the World Wide Web, and the incredible assortment of on-line services, have likewise immersed the home computer in a sea of information. Combining the two—the television as a center for viewing video with the data storage and on-line capabilities of the home computer—is a challenging task that is not without difficulties. The independent developments of these areas of technology have produced sometimes conflicting standards, a natural consequence of the divergent origin of computer and entertainment media.

Television monitors typically present video images in the form of a rapid sequence of video fields, changed at a high frequency to create the illusion of motion. Television cameras and other sources of video generally do not produce full-frame images; rather, such video sources typically produce a field consisting of about half of the lines of each full-frame image, at a rate of 60 such fields per second. Alternate fields contain alternate lines of video data. In other words, one field contains the odd-numbered lines, and the next field contains the even-numbered lines. Accordingly, each field of the video may be identified as an "odd" field or an "even" field. The sequence of video fields alternates between the odd fields and the even fields. A television monitor receiving the sequence of fields then reproduces each video field in the sequence. Each field is displayed on the television screen only on half of the scan lines; first an odd field is displayed, using the odd-numbered scan lines, then an even-field is displayed using the even-numbered field lines, etc. The television scans a raster across the screen from the top left to the top right, producing a first scan line ("scan line #1"), then invisibly returning the raster to the left edge of the screen to a position slightly below the original position. The position to which the raster returns, however, is not immediately below the first scan line, but allows sufficient space to accommodate an intervening scan line on the alternate field. The raster then scans across to the right edge of the screen to produce a second scan line ("scan line #3"), and thus continuing to the bottom edge of the screen. The distance between the scan lines is a function of the size of the window, but generally allows an intervening scan line (the first scan line of the other field, i.e. "scan line #2") to be drawn after the completion of the first field. The invisible return of the raster to the left edge of the screen after scanning each scan line is a flyback or horizontal refresh stage that occurs much more rapidly than the visible left-to-right lines. In this manner, approximately 485 active scan lines may be produced to complete a single video frame, half of which is displayed in each field. Once reaching the bottom edge of the screen, the raster is then invisibly returned to the original position at the top left corner during a "vertical blanking interval" stage. The horizontal and vertical blanking interval stages are high speed and invisible. Sixty fields per second may be produced. With respect to typical television, this "interlaced" video scanning approach is an appropriate compromise between vertical refresh rate, vertical resolution, and limited bandwidth.

Although alternating between an odd frame and an even frame may be appropriate for lower-resolution real time video images, computer displays generally must use a progressive video system in which each full frame is presented in sequence, in order to reproduce precise higher resolution graphics information. Displaying computer information in an interlaced manner, in order to mix it with video, would present several unacceptable artifacts. For example, when a narrow horizontal line or edge is a significant part of the image, the line may appear in only one of the two fields. If the narrow horizontal line happens to fall in the odd field, that is, on a scan line having an odd number, then the line only appears when the odd field is being presented. Likewise, a horizontal line in the even field would only be presented when the even field is being presented. Because the odd and even fields alternate, the line or edge thus appears to blink or flicker at a rate of 30 times per second, which is noticeable to most people. This effect is illustrated in FIGS. 5A–5C, discussed below. A similar problem occurs when a horizontal line is two pixels in width. If a horizontal line is two pixels in width, a single line will appear in each of the odd and even fields. Because these fields are presented alternately, the horizontal line will appear to move slightly in the vertical direction, apparently bouncing or wavering. A two-pixel wide line is shown in FIG. 5D. Not only are these artifacts of flicker and waver distracting in computer graphics, where precise location of lines and edges is crucial, but are exacerbated in a large-screen display, in which each scan line or pixel of the video image is translated to a large region of color or of gray scale on the large screen, making waver even more noticeable.

This leaves the approach of trying to display the interlaced video in a progressive manner, in order to mix the two sources. One approach for this is the "static mesh" approach, in which two successive fields of video are combined and displayed simultaneously. Referring to FIGS. 4A and 4B, the static mesh approach is shown, illustrating deinterlacing of the odd and even fields when both fields contain data. The scan lines in the odd field are mapped to odd lines on the display, and the scan lines in the even field are mapped to the even lines on the display. While this static mesh approach works ideally for stationary images, distracting artifacts are created when the image is moving, since the odd and even fields are received at different times and describe the image (as seen at the video source) at slightly different moments in time. Typically, the temporal displacement between successive fields is ⅙₀th of a second. When an image moves, successive video fields present the image in a slightly different position. If the object moves slowly, and the odd field and the even field are shown together in the same frame, any edge becomes blurred or shadowed, as the two images appear close to one another. Another problem caused by the motion of the object is double-vision or ghosting, seen when the object is moving more quickly. One effect of the motion of the image is shown in FIG. 4C. Two images may be presented, as the odd lines of the image show one field and the even lines of the image show a different field. Because the even and odd fields are from different times, combining the two images in the "static mesh" can produce a "tearing" or "feathering" around the edges of moving items. This effect is highly noticeable to many users. Although the static mesh approach is highly appropriate to still images, this tearing or feathering approach is noticeable when an image is moving.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

Figure 5A:
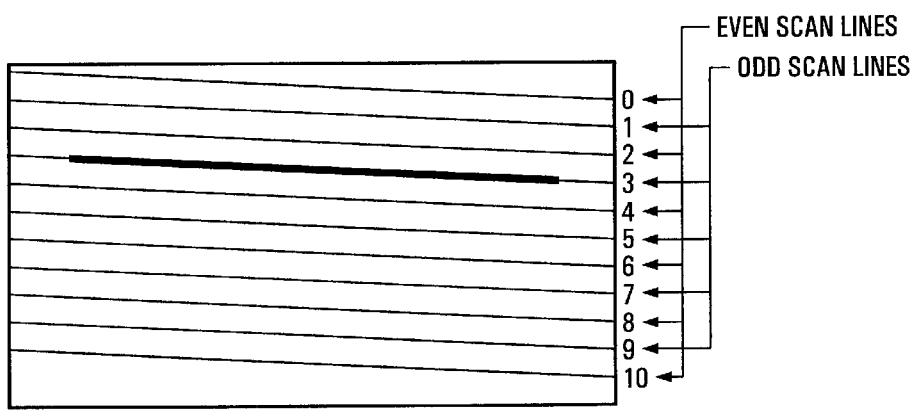
FIG. 5A shows a simplified video scan pattern according to the prior art, comprising a simplified 11-scan line full-frame video image having a narrow horizontal line drawn on the scan line number 3.
Figure 5B:
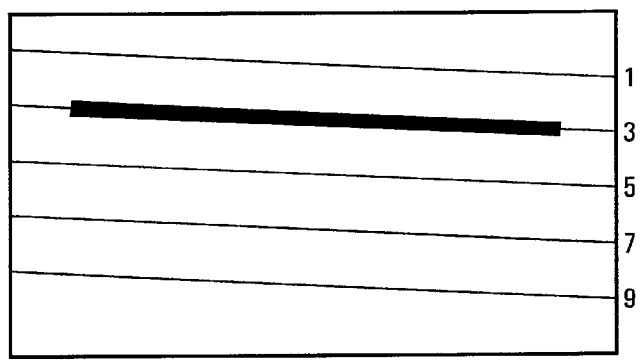
FIG. 5B shows the horizontal line in one of the fields.
Figure 5C:
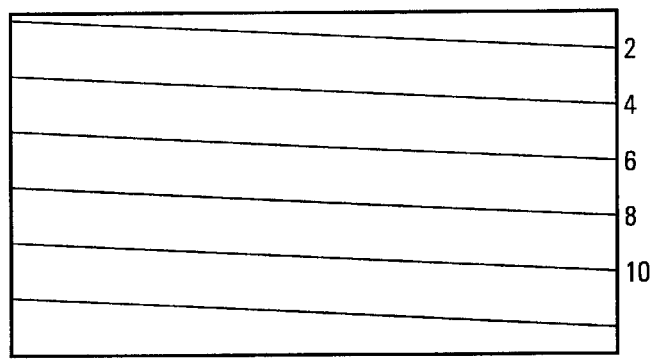
FIG. 5C shows the other field in which the horizontal line is absent, since the line is not wide enough to exist on more than one scan line.

Referring now to FIG. 5A, a simplified video scan pattern according to the prior art is shown. Commonly, video signals are presented to a monitor or multimedia display by tracing scan lines across the monitor horizontally. At the end of each scan line, a raster provides a flyback or horizontal refresh to the beginning of the next scan line. At the end of the image, typically at the bottom of the screen, a vertical blanking interval or vertical refresh restores the raster to the top of the screen. In many systems, 485 active scan lines are provided. Due to the time required to trace out 485 active scan lines, however, and because the human eye is generally incapable of distinguishing a particular scan line from the scan line immediately above or below it, many systems use an alternating approach to presenting video information. Initially, the video monitor scans horizontally, but presents only the even numbered lines to the screen. In other words, the horizontal information is presented only on alternating lines. At the bottom of the screen, the vertical blanking interval (vertical refresh) restores the raster to the top of the screen, and the odd numbered lines are then presented. At the bottom of the screen, after the odd lines have been presented, the vertical blanking interval restores the raster to the top of the screen, and the cycle is repeated, with the even numbered lines next being presented. The vertical blanking interval (VBI) is in addition to the active scan lines, bringing the total to 525 scan lines, of which 485 are active and the remainder are associated with the VBI. FIG. 5A illustrates this approach, depicting a simplified 11-scan line display having a horizontal line drawn on the scan line number 3. In FIG. 5A, a narrow horizontal line is present in a full-frame video image. The horizontal line may be an edge of an object within the video frame, or may be a very narrow object such as a border or line in the image. FIG. 5B shows the horizontal line in one of the fields. The line is included, because it occurs on one of the scan lines that forms the relevant field. However, FIG. 5C shows the other field. In FIG. 5C, the horizontal line is absent, since the line is not wide enough to exist on more than one scan line. As described, the fields of FIG. 5B and FIG. 5C alternate in normal video. Thus, in normal video or other situations in which the two fields are alternately presented, the line will be present when one field is being displayed and absent when the other field is being displayed. The line will appear to flicker, at a frequency of about ⅓₀th of a second.

Figure 5D:
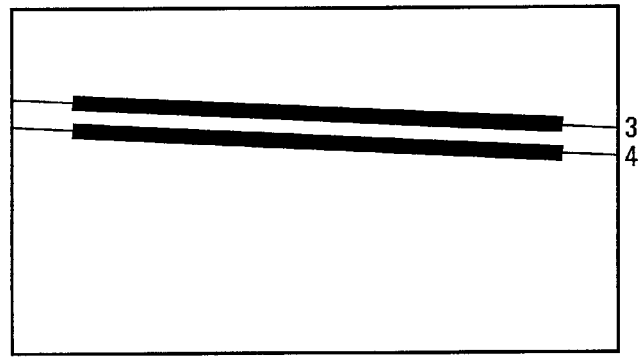
FIG. 5D shows a full-frame image having a narrow horizontal line that is present on two fall-frame scan lines.

Referring now to FIG. 5D, a full-frame image having a narrow horizontal line that is present on two full-frame scan lines is shown. As can be expected, when an odd field and an even field are formed from the video frame of FIG. 5D, each field will have a single horizontal line one pixel wide. As the fields alternate, the line will appear to bounce up and down, since the two fields display their lines at slightly different positions on the display screen.

Figure 4A:
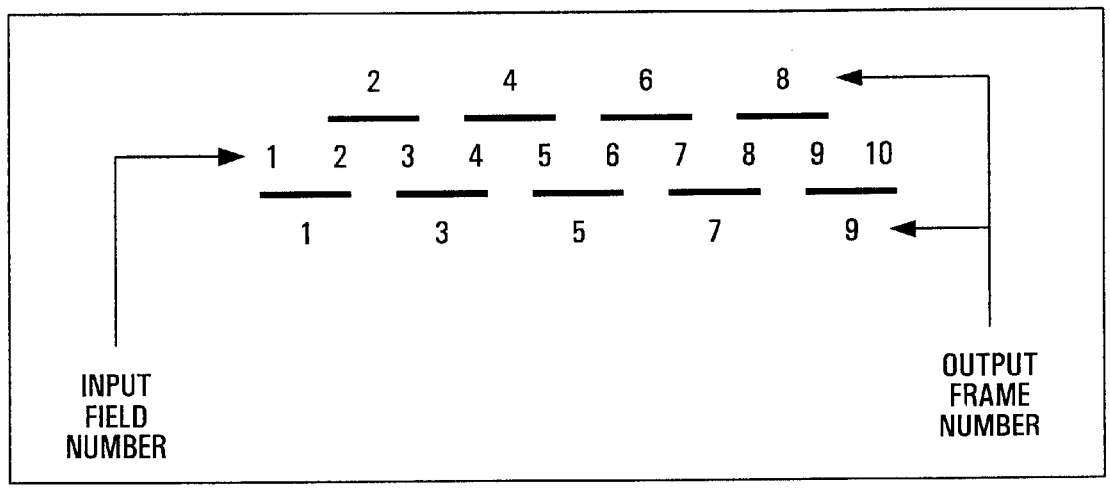
FIGS. 4A and 4B show deinterlacing of consecutive odd and even input fields according to the static mesh approach when both fields contain data.
Figure 4B:
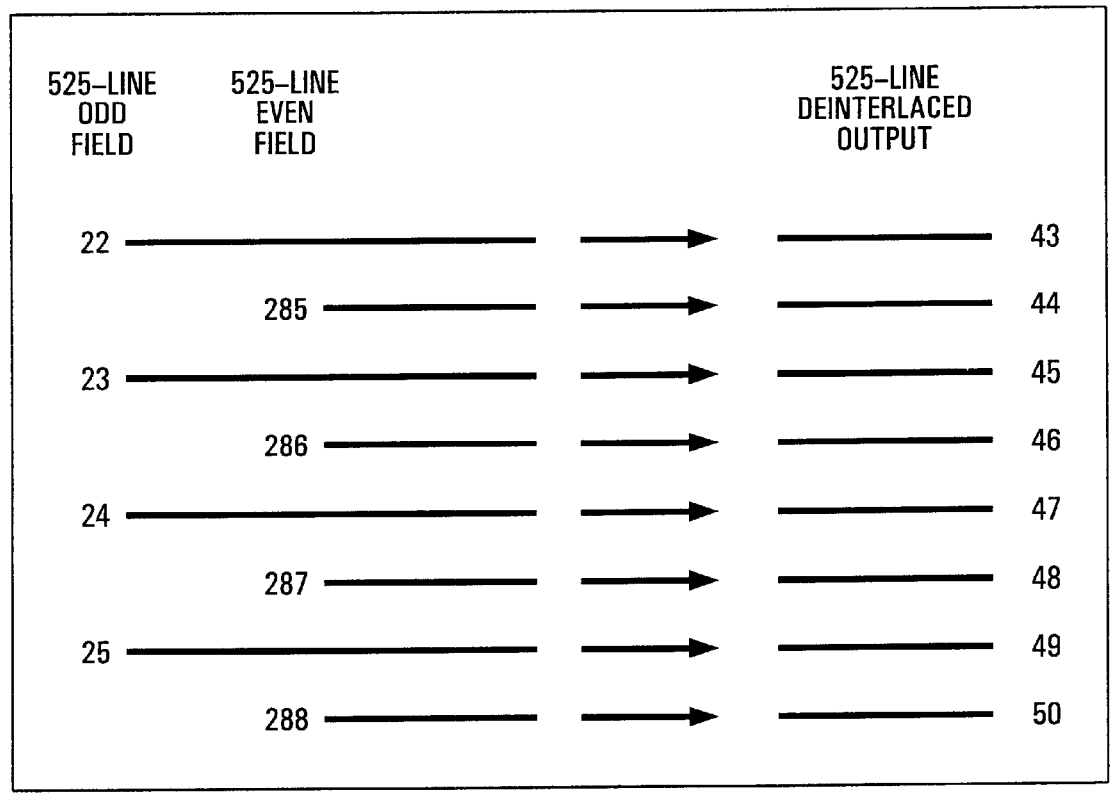
Figure 4C:
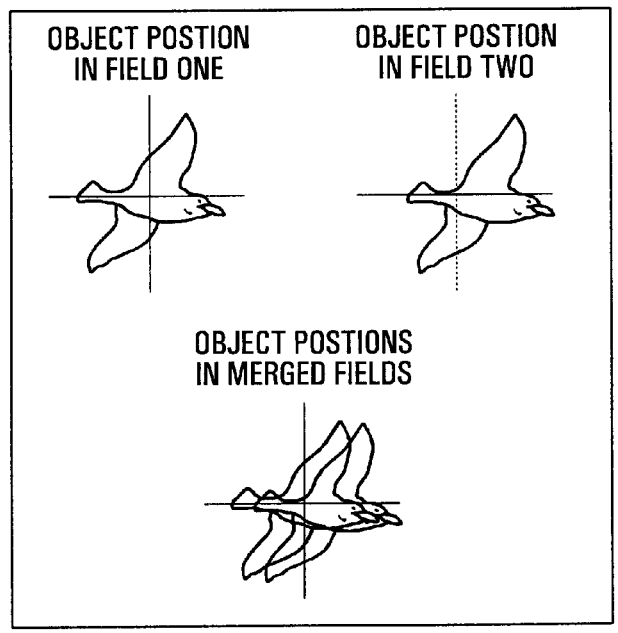
FIG. 4C shows one effect of the motion of the image in the static mesh mode.

Referring now to FIGS. 4A and 4B, deinterlacing of consecutive input fields is shown in greater detail. For example, the deinterlacing of the first and second input fields to produce the output frame number 1 is illustrated. A first field that is either the odd or even field consists of either 262 or 263 lines of video data. Similarly, a second input field that is either the even or odd input field consists of either 262 or 263 scan lines of video data. Specifically, for example, the first field maybe input field #1 and the second field maybe input field #2, as shown in FIG. 4A. Alternating lines of the two fields are deinterlaced or enmeshed together, producing a 525 line deinterlaced output, as shown in FIG. 4B. As shown in FIG. 4A, input fields #1 and #2 are deinterlaced to produce output frame #1. FIG. 4B shows the deinterlacing method in greater detail. Line 22, for example, in the odd field (input field #1) is presented as line 43 of the deinterlaced output. Line 23 of the odd field is presented as line 45 of the deinterlaced output. Between the two adjacent lines of the odd field thus presented, line 285 of the even field is presented as line 44 of the deinterlaced output. Consequently, and in this manner, adjacent lines of the deinterlaced output are derived from alternating input fields.

As shown in FIG. 4A, a first input field is received. Immediately thereafter, a second input field is received, and the first and second input fields are deinterlaced together and presented via the VGA graphics system on the monitor 40 (as frame number 1). The second input field is temporarily stored in an input buffer, so that the second input field will remain available after the deinterlacing with the first input field. Soon thereafter, a third input field is received. The second input frame, still available from the input buffer, is deinterlaced with the third input field and the deinterlaced frame is presented via the VGA graphic subsystem on the monitor (as frame number 2). The third input field also replaces the second input field data in the input buffer. Subsequently, a fourth input field is received. The fourth input field is deinterlaced with the third input field data in the input buffer, and the deinterlaced frame presented via the VGA graphics subsystem on the monitor 40 (as output frame number 3). The fourth input field is also stored in the input buffer, replacing the third input field data in the input buffer. In this manner, thereafter, additional input fields are similarly received, are interlaced with data in the input buffer, the interlace stored alternately in the odd and even buffer, and the new input field replaces the previous data in the input buffer.

Figure 4D:
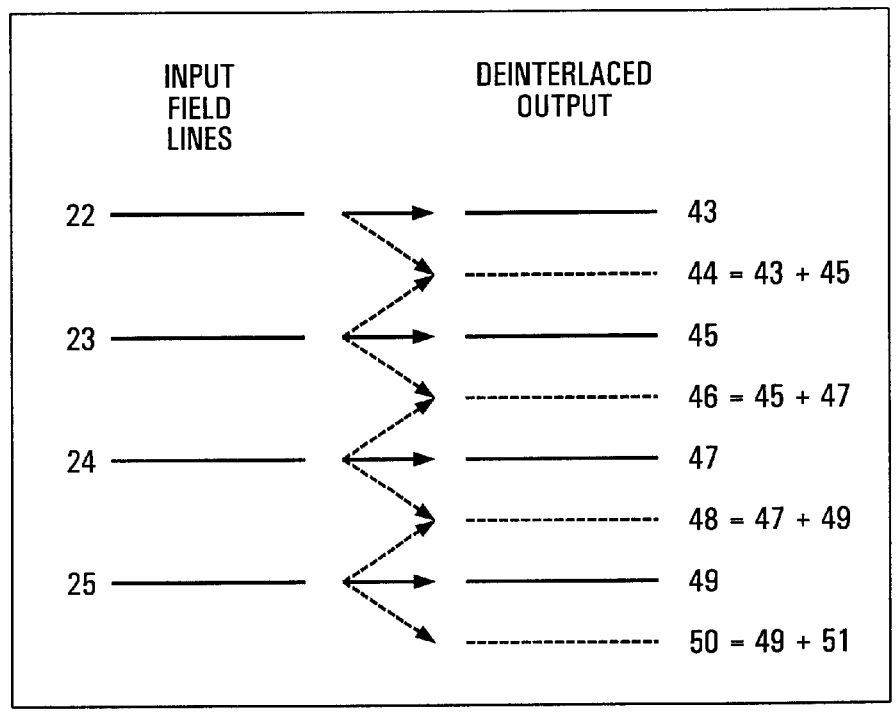
FIG. 4D shows the field scaling approach to deinterlacing when only one field contains data.

Referring now to FIG. 4D, the field scaling approach to deinterlacing when only one field contains data is shown. As described above, some video sources, such as Nintendo and other video games, provide only one type of field. Typically, such systems provide an even video field but do not provide an odd video field. Many video systems using such input sources have empty black lines between the active lines. Therefore, in some embodiments, the present invention includes a detector that determines whether fields of only one type are being presented. As stated previously, the entire full frame of a video image comprises 485 active scan lines and a vertical blanking interval of a duration corresponding to 40 additional (invisible) scan lines, for a total of 525 scan lines. Each field therefore contains half that number, i.e. 262 or 263 scan lines of which approximately 240 contain data. The sequence of input fields is not deinterlaced as shown in FIGS. 4A and 4B, but rather according to a method illustrated in FIG. 5B. The difference between the method shown in FIGS. 4A and 4B and the method shown in FIG. 5B is explained by the absence of odd numbered input fields, or even numbered input fields, in the latter. When only one input buffer is used, the graphics system must generate the missing scan lines. One method for deinterlacing a single input field is shown in FIG. 5B. Line 22 of the single field provides line 43 of the deinterlacing output, similarly to the method shown in FIG. 4B. Also, line 23 of the input field provides line 45 of the deinterlaced output. However, in the absence of an even field, line 44 is calculated through an interpolation of the adjacent lines that are present. As shown in FIG. 4B, line 44 of the deinterlaced output is derived from an averaging of line 43 and 45 of the deinterlaced output.

Figure 1A:
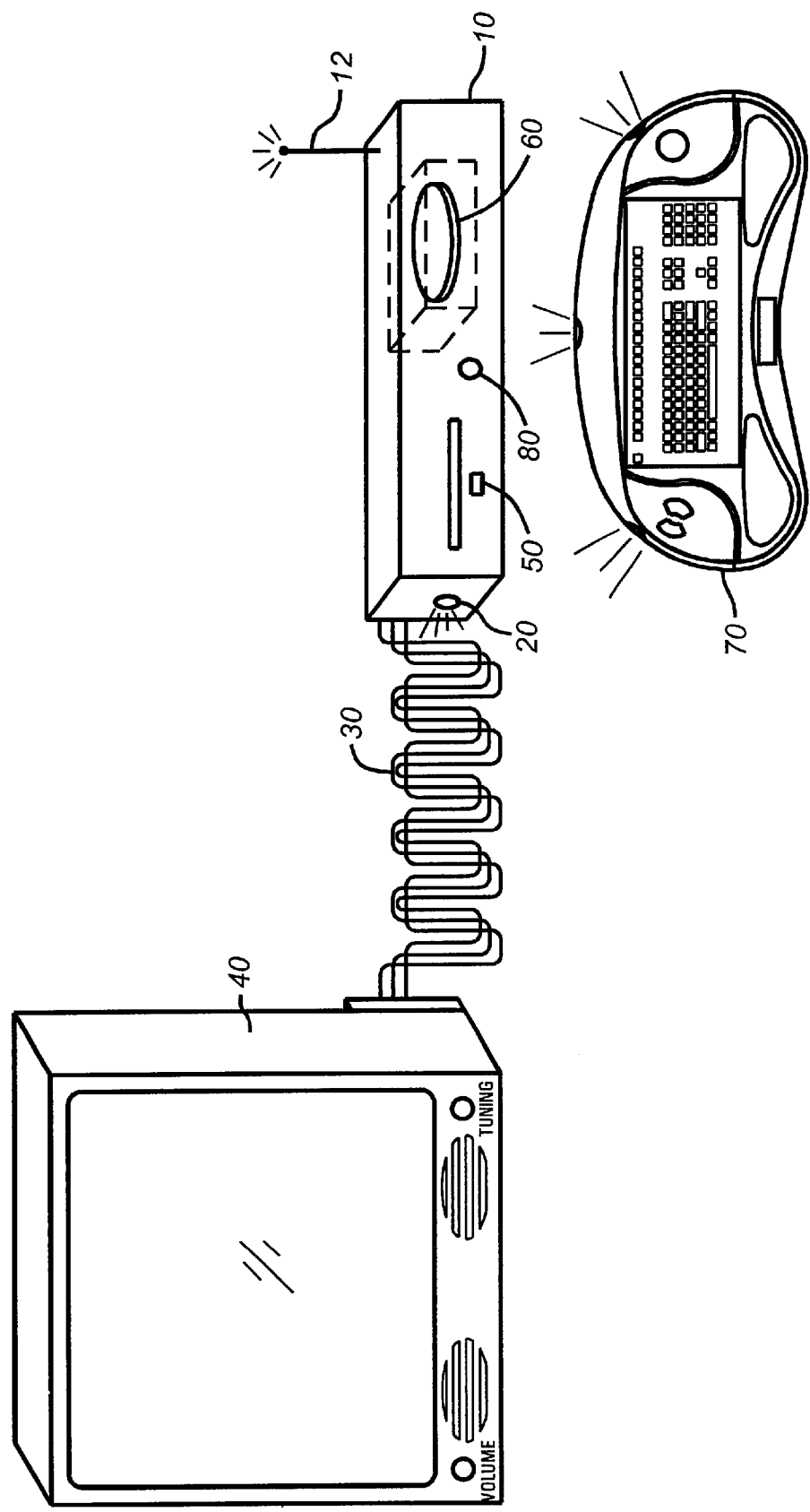
FIG. 1A shows a home theater computer system.

Turning now to FIG. 1A, a home theater computer system is shown. The home theater computer system of FIG. 1A provides computing capability as well as audiovisual theatrical projection capabilities. The home theater computer system of FIG. 1 revolves around a computer base unit 10 which is multimedia-capable. Multimedia refers to the integration of text, audio, graphics, still image, and moving pictures into a single computer-controlled product. It includes the combination of computers, video or compact disc players, video monitors, optical scanners, audio cards, music synthesizers, etc., all linked together by system software.

In the home theater computer system of FIG. 1A, the normal computer display which is optimized for viewing at 15–18 inches from the user's eyes is replaced with a high resolution display unit 40, which is preferably a VGA compatible display with resolutions of 720×480 pixels. The display unit 40 is driven by the computer base unit 10 via a cable 30. The display unit 40 is capable of acting as either a computer monitor in one mode of the system or as a television unit in a second mode. When receiving TV transmission, the computer base unit 10 has a tuner 12 for receiving TV signals over the airwaves.

The computer base unit 10 of FIG. 1A also contains a compact disk read only memory (CD-ROM) drive 60, a floppy drive 50, and a plurality of communications ports 20 and 80, preferably radio-frequency or infrared data ports. The communication ports 20 and 80 communicate with a keyboard 70. In addition, the computer housing 10 has a tuner 12 for receiving television transmissions. With respect to the keyboard 70, the keyboard transmits serial information over one or more infrared connections thereby achieving wireless portability.

Figure 1B:
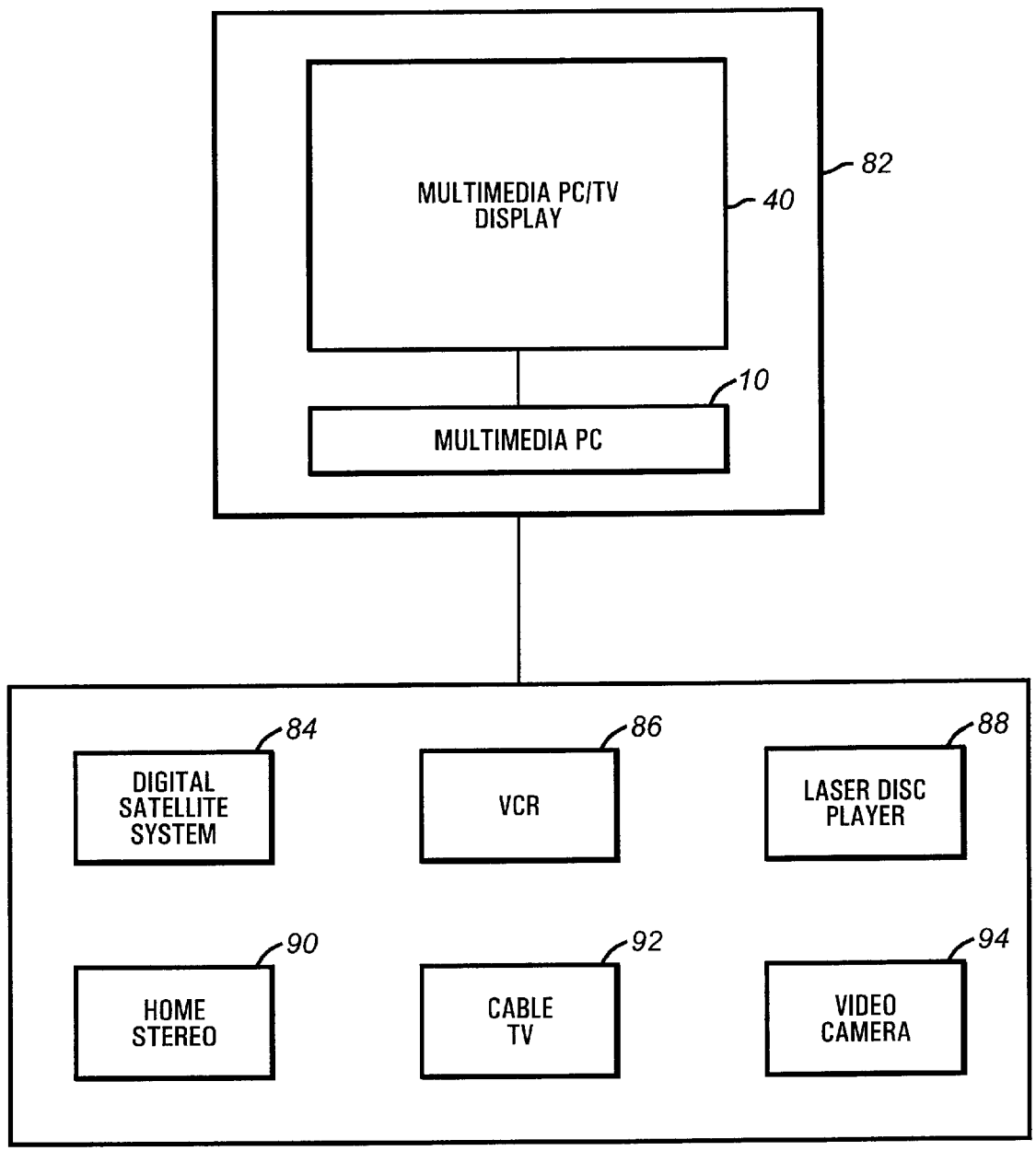
FIG. 1B shows a block diagram of the home theater system of the present invention.

Turning to FIG. 1B, a block diagram of the home theater system of the present invention is shown. The PC theater 82 of the home theater system includes a multimedia PC/TV display 40 and a multimedia PC 10. The multimedia big screen display or monitor 40 displays a digitally enhanced picture. The PC theater 82 provides at least a PC mode and a TV mode. In the PC mode, the multimedia PC 10 provides the necessary hardware. The PC theater 82 can be connected to a variety of multimedia equipment, such as a digital satellite system 84, a VCR 86, a laser disc player 88, a home stereo 90, cable TV 92 or a video camera 94. In this way, the home theater system provides and integrates various multimedia functions.

Figure 2:
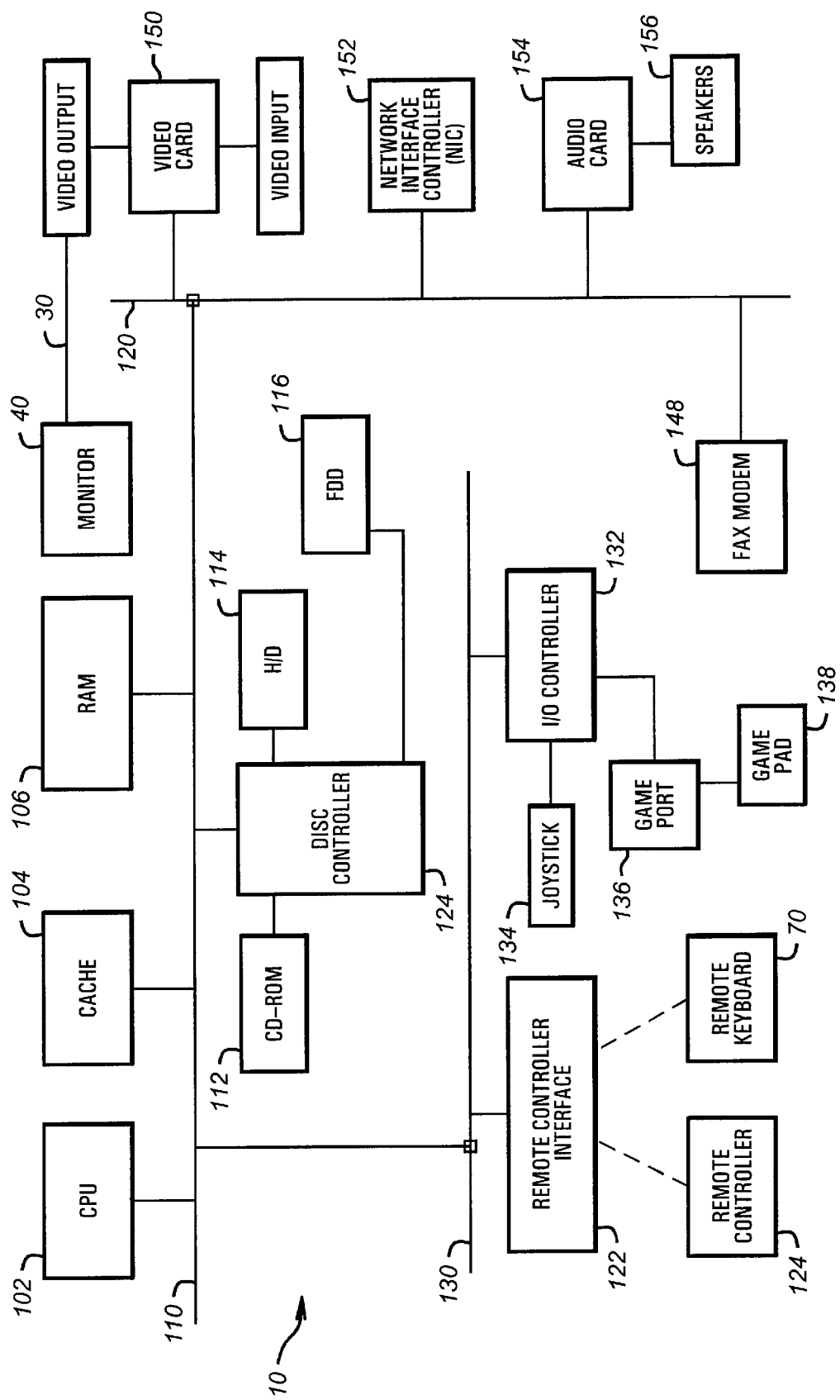
FIG. 2 shows a simplified block diagram of a computer system C is shown including a video card 150.

Referring now to FIG. 2, a simplified block diagram of a computer system C is shown including a video card 150. A central processing unit 102 is coupled to a host bus 110. The central processing unit 102 may be a single microprocessor, such as an Intel Corporation 486 or PENTIUM™, or a more complete CPU system including multiple microprocessors, a cache controller, external coprocessors, and other components, coupled to one another or to the host bus 110. The host bus 110 functions to interface the CPU 102 to the rest of the computer system C. The host bus 110 typically is located on a motherboard, but may be configured as any of a number of other subsystems, as known in the art.

Also coupled to the host bus 110 is a cache 104. The cache may be a write through, a write back, or multi-level cache system for storing commonly used or recently used data values. The cache generally consists of a high speed static RAM structure, addressable within the memory space of the CPU's address lines.

A main memory, typically comprising a dynamic RAM 106, is coupled to the host bus 110. The main memory provides relatively high speed data storage for instructions and data needed for the processor to perform its functions.

Also included in many computer systems is a dedicated ROM (not shown) providing system BIOS and other firmware sets of instructions to the processor, on initial bootup and also thereafter.

Also coupled to the host bus 110 is a disc controller 118. The disc controller 118 typically has a number of IDE ports to couple external devices. The disc controller 118 may be coupled directly to the CPU or to main memory, or may be a separate device on the host bus 110. The disc controller 118 provides a connection to a CD ROM 112, a hard disc 114, a remote controller interface 122, and an input/output controller 132, and a floppy disc drive 116. The CD ROM 112 provides optical storage and data retrieval capabilities, and the hard drive 114 and floppy disc drive 116 provide magnetic storage device capabilities to the computer system.

Also coupled to the host bus 110 are two extension buses. The first extension bus is a PCI bus 120, coupled to the host bus 110 via a PCI bridge. The PCI bus 120 is coupled to a plurality of additional devices, including the aforementioned video card 150, a network interface controller 152, an audio device or audio card 154, a fax modem 148, and in some embodiments an additional PCI bridge (not shown). The video card 150 typically includes a graphics processor and a video graphics adapter, and is coupled to a monitor 40 via a coaxial cable 30 or other computer connector. The audio device 154 generally is coupled to audio speakers 156 or other audio output device to provide an audio output.

A second extension bus 130 is coupled to the host bus 110, providing an extension for additional peripheral components. Although typically configured as an X-bus or an ISA bus, the extension bus 130 may alternately be configured as an EISA, a PCI bus, a microchannel bus, or any of a variety of other bus structures commonly used and known.

The remote controller interface 122, coupled to the second extension bus 130, provides infrared signal detection, and is optically and remotely coupled to a remote keyboard 70 and a remote controller 124. The remote keyboard 70 and remote controller 124 allow a human user or an external device to communicate data via the remote controller interface 122 to the computer system C, without direct wired connection.

The input/output controller 132, also coupled to the second extension bus 130, provides connection between the extension bus 130 and various devices, including a game port 136 coupled to a game pad 138 and to a joy stick 134. Although these devices are shown coupled through the input/output controller 132 to the extension bus 130, it will be recognized that other configurations are possible; for example, the joy stick 134 may instead be coupled to an infrared device for communicating directly to the remote controller interface 122.

It will be recognized that additional devices may be coupled via IDE controllers and other connectors to the various buses, providing resources and buffering for external devices. The flexibility of the computer system therefore is not restricted to the particular example shown in the figure. In many computer systems, the hardware configures itself according to the instructions in the BIOS upon power up.

Figure 3:
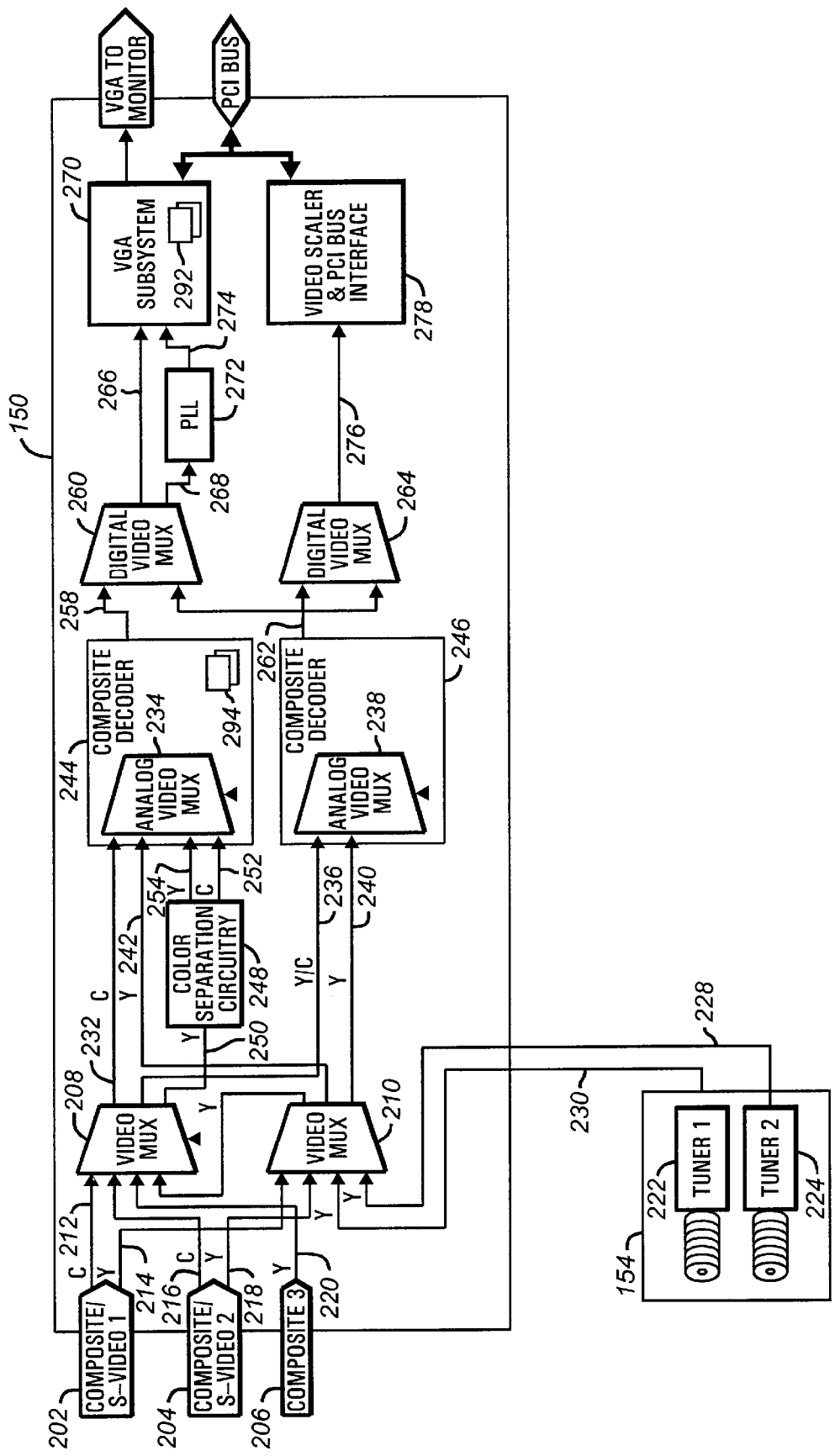
FIG. 3 shows a schematic diagram of the video card 150 of the home theater system of the present invention.

Turning to FIG. 3, a schematic diagram of the video card 150 of the home theater system of the present invention is shown. The inputs to the video card 150 include three composite video signals provided through Y1C video connectors, composite_1 202, composite_2 204, and composite_3 206. The constituent signals of the three input composite signals are provided to a pair of video multiplexers 208 and 210. The chrominance signal 212 from the composite_1 signal 202 is provided to video multiplexer 210, and the luminance signal 214 of the composite_1 signal 202 is provided to video multiplexer 210. The chrominance signal 216 of the composite_2 signal 204 is provided to video multiplexer 208, and the luminance signal 218 of the composite_2 signal is provided to video multiplexer 210. The composites signal 206 includes a luminance signal 220 which is provided to video multiplexer 208. Tuners 222 and 224 located on the audio card 154 of the computer system 10 also provide input luminance signals 228 and 230 to video multiplexer 210. Other devices that are provided on the audio card 154 are not shown as the audio card 154 is not critical to an understanding of the invention.

A signal 232 outputted from video multiplexer 208 is provided to a primary analog video multiplexer 234. Video multiplexer 208 also provides a Y/C signal 236 to a secondary analog video multiplexer 238. Video multiplexer 210 provides two signals 240 and 242; one signal 242 is provided to the primary analog video multiplexer 234, and the other signal 240 is provided to the secondary analog video multiplexer 238. The analog video multiplexer 234 is integrated into a primary video composite decoder 244, and the secondary analog video multiplexer 238 is integrated into a secondary video composite decoder 246. The primary decoder 244 of the present invention may or may not include color separation circuitry.

The video board 200 of the present invention includes color separation circuitry 248 external to the primary decoder 244. The color separation circuitry 248 receives a composite signal 250 as an input from video multiplexer 208 and outputs a chrominance signal 252 and a luminance signal 254 to the primary analog video multiplexer 234 of the primary decoder 244. The color separation circuitry 248 includes a digital comb filter 256. Within the digital comb filter 256, video information is converted from analog to digital and back to analog. The decoded video signal 258 outputted by the primary video composite decoder 244 is provided to a digital video multiplexer 260. Similarly, the output video signal 262 of the secondary video composite decoder 246 is provided to a digital video multiplexer 264.

The primary digital video multiplexer 260 provides two outputs 266 and 268. One output 266 is provided directly to the VGA subsystem 270. The other output 268 is directed to a phase-locked-loop 272 (PLL). The PLL 272 supplies a clock signal 224 to the VGA subsystem 270. The VGA subsystem 270 has two memory areas; one area is used as an off-screen memory area for storing video information such as font information and data yet to be displayed. The other memory area is used to store data which is currently being displayed. The VGA subsystem 270 also includes a VGA controller. In displaying data, the VGA controller reads from the off-screen memory, scales the data if needed, performs color space conversion, and then sends the data through a digital-to-analog converter (DAC) to the display. In the secondary path, the secondary digital video multiplexer 264 provides a signal 276 to a video scaler and PCI bus interface 278. When data is sent over the secondary path, the data is downscaled if needed and then burst over the PCI bus 120 into the off-screen memory area of the video memory. The secondary path is typically used for picture-in-picture (PIP) functionality or pulling up web pages contained in the vertical blanking interval while watching television on the display 40 which are encoded in the vertical blanket interval (VBI).

Figure 3A:
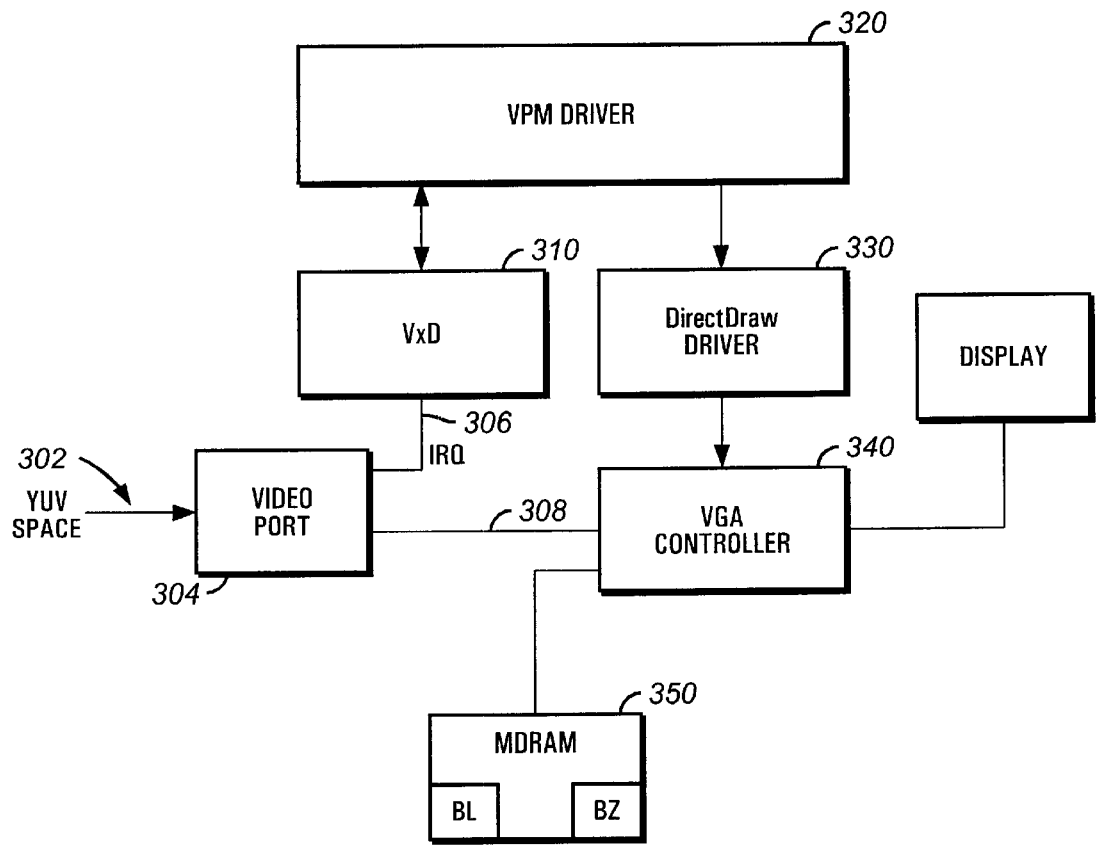
FIG. 3A shows the VGA subsystem in greater detail is shown.

Referring now to FIG. 3A, the VGA subsystem in greater detail is shown. A video source signal 302, in YUV space, is received at a video port 304 to the VGA subsystem. The video port 304 is preferably a Viper 6100 video port from Tseng Labs. The video port 304 crops the input signal to a field size of 720 pixels by 240 pixels. The video port provides an interrupt IRQ signal 306 and a video signal 308. The IRQ 306 is interpreted by a VxD 310, a software component running on the main system processor, to indicate that a video field has been received at the video port. The video port 304 also provides a video signal directly to the VGA Controller 340. The direct signal from the video port 304 to the VGA Controller 340 includes video data of the active field. The VGA Controller 340 has coupled thereto an MDRAM, for storing the odd field and the even field. The MDRAM 350 includes two regions, or a pair of buffers or a segmented buffer, each region storing video data pertaining to one or the other video field. At any moment in time, one of the buffers or segments in the MDRAM 350 is a frontbuffer, and the other is a backbuffer. Flipping between the frontbuffer and the backbuffer is performed when a new field is received by the input port 304, at which time the IRQ 306 is generated.

The VxD 310 identifies the arrival or end of a received video field to the VPM driver 320, and sets a register in the graphics controller corresponding to where to store the data corresponding to the video field. The VxD 310 also identifies whether the input video signal 302 received by the video port 304 at that moment is an even field or an odd field and provides the identification to the VPM driver 320. The VPM Driver 320, like the VxD 310, is in software and is running on the main video processor, and can call a DirectDraw Driver 330. The identification as odd or even is performed regardless of the operating mode of the VxD 310; in the FieldScale mode with odd/even source, odd fields are directed to one buffer and even fields are directed to the other, while in the OneField mode either odd or even fields are directed to both buffers. The VxD 310 receives the addresses of the appropriate buffer from the VPM driver 320, which counts the number of consecutive fields of a given type and can command switching from one operating mode to another.

The VPM Driver 320 provides the common interface for control of the video port (via the VxD 310) and DirectDraw overlay surfaces. The VPM Driver 320 calls the DirectDraw Driver 330 in order to indicate which buffer to display, and where it should be displayed.

The DirectDraw Driver 330 is in software and is running on the main video processor. The DirectDraw Driver 330 is responsible for making the graphics controller display the fields in an appropriate manner, and mixing video field data with graphics information for display.

In the FieldScale mode with an odd/even source, received fields are placed alternately in the odd and even buffers. Therefore, all the odd fields are placed in one buffer and all the even fields are placed in the other buffer. The DirectDraw Driver 330 is used to make the graphics controller present data from the two buffers alternately on the display. There is no meshing of the images from one buffer with the images from the other buffer, except in the eye of the person viewing the image. Each field is scaled as described below in reference to FIGS. 6A and 6B.

Figure 6A:
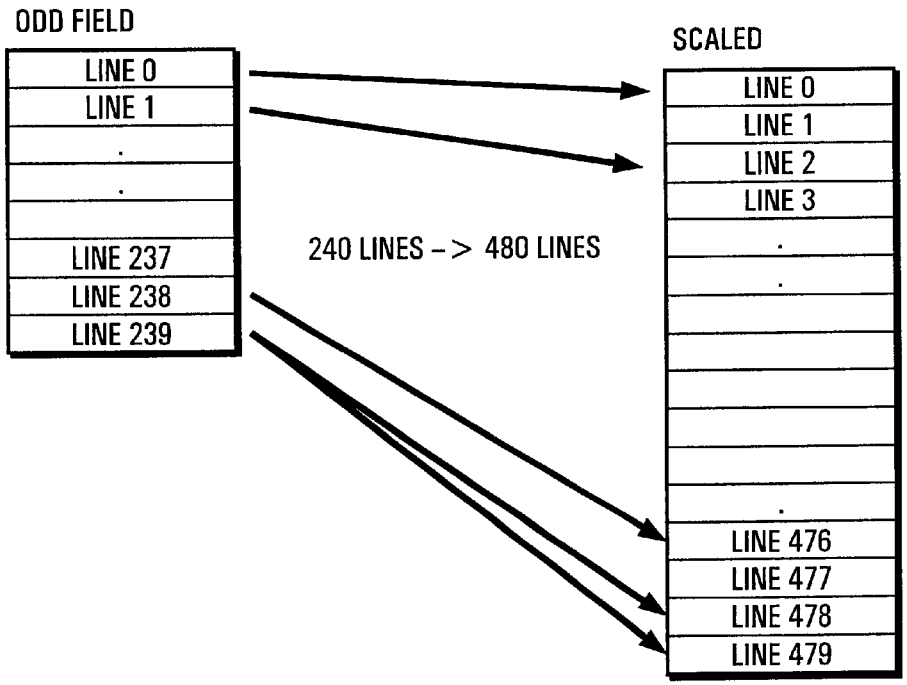
FIGS. 6A and 6B show the FieldScale approach as performed in the VPM Driver according to instructions from the DirectDraw Driver.
Figure 6B:
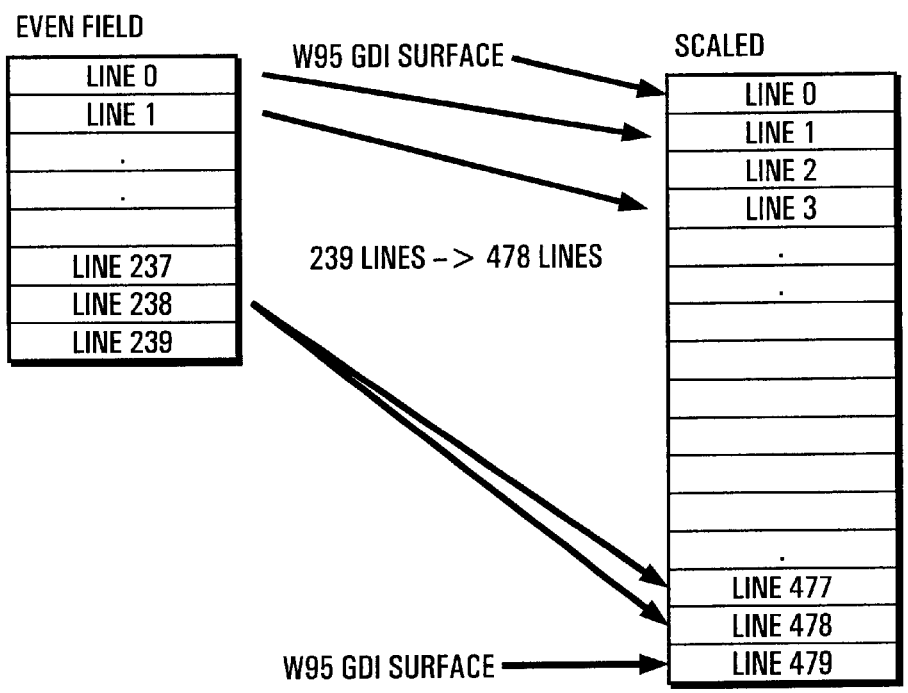

Because data from one field only is presented at any given moment in time, temporal data from different points in time are not mixed. Each field is received individually, and is displayed individually. As with standard video, motion is achieved in the eye of the viewer. The interpolation of the missing scan lines provided in the FieldScale algorithm of FIGS. 6A and 6B provide almost as good a resolution as would copying the missing scan lines from the alternate field, and eliminates the temporal artifacts of blurring and double imaging caused by mixing temporal data. Also, because the alternate field is flipped onto the field of view only $\frac{1}{60}$th of a second later, the human eye provides a mixing of the interpolated scan line with the true data in the alternate field, substantially correcting for any loss of resolution.

In the OneField mode with an even-only or odd-only source, i.e. when the VPM Driver 320 has commanded the VxD 310 to switch to OneField mode, the VxD 310 driver responds by placing either received odd frames in both buffers or received even frames in both buffers. This is common when the video source is received from a video game, for example. The fields are scaled according to the field scaling described below in reference to FIGS. 6A and 6B, and the resulting graphics signal is provided at the normal frame rate. The VPM Driver 320 passes the addresses of both buffers to the VxD 310 and the VxD 310 stores the data in both buffers accordingly. (In an alternate embodiment, only one buffer (or segment of a buffer) need be used. Each received field is placed simultaneously in both buffers, and the VPM Driver 320 performs flipping normally). The DirectDraw Driver 330 is used to make the graphics controller present data from the two buffers alternately on the display, just as in Field Scale mode. However, in the OneField mode, the two buffers are scaled in the same manner, without displacement. Each field is scaled as described below in reference to FIGS. 6A and 6B.

The VGA Controller 340 is preferably an ET6000, from Tseng Labs. The VGA Controller 340 is further coupled directly to the video display or monitor. The VxD 310, VPM Driver 320, and DirectDraw Driver 330 are all software components, running on the main system processor. The VPM Driver 320 determines whether the video input signal includes a single field source such as from a video game or a compound field source (i.e., an alternating sequence of odd and even fields) such as from a standard video source. The VPM Driver 320 calls the DirectDraw Driver 330 which provides all of the direct manipulation of the overlay surfaces.

Referring now to FIG. 6A, field scaling of the odd fields is performed when so indicated by the VPM Driver 320. The odd field 602 contains 240 lines, corresponding to the odd-numbered scan lines in the video frame. Field scaling is initiated by the VPM driver 320, described above with reference to FIG. 3A, when the ratio of the window or display size to the size of the odd field exceeds the predetermined threshold. In the preferred embodiment, field scaling is performed when the ratio exceeds 1.5. As shown in FIG. 6A, line 0 of the odd field is mapped directly to Line 0 of the scaled field. The graphics controller then interpolates Line 1 of the scaled field, based on the values of line 0 and line 1 of the odd field. Then, line 2 of the scaled field is mapped from line 1 of the odd field. In this manner, the larger scaled field is determined from the odd field, without reference to any value of the even field. Only the scan lines of the odd field and the values interpolated therebetween determine the scaled field lines. Generally, all of the odd field lines and none of the even field lines are used, and are mapped directly to particular lines of the scaled field, and additional scaled lines are thus determined by interpolation. Although not shown, horizontal enlargement or shrinking of the image may be accomplished simultaneously.

Referring now to FIG. 6B, field scaling of the even fields is performed when so indicated by the VPM Driver 320. The even field 602 also contains 240 lines, corresponding to the even-numbered scan lines in the video frame. Field scaling is initiated by the VPM driver 320, described above with reference to FIG. 3A, when the ratio of the window or display size to the size of the odd field exceeds the predetermined threshold. In the preferred embodiment, field scaling is performed when the ratio exceeds 1.5. In comparison to the odd field scaling, however, even field scaling has additional boundary problems. For example, because the even field is displaced in the video source by one line, the even field must be displaced or offset by one line in relation to the odd field when displayed. This offset is accomplished by the insertion of an additional boundary line into line 0 (or, if the scale ratio is extremely large, lines 0–n, where n is a number larger than 0). The boundary lines can be derived from any of a number of sources. For example, in the preferred embodiment, the boundary line is black. In other embodiments, the boundary line is derived from the Windows 95 background. In still other embodiments, the boundary line is derived from line 0 of the other frame.

Continuing to refer to FIG. 6B, once the boundary line has been determined, line 0 of the even field is mapped directly to the next scaled field line. When the boundary is only one scan line wide, as shown in FIG. 6B, line 0 of the odd field is mapped directly to Line 1 of the scaled field. The graphics controller then interpolates Line 2 of the scaled field, based on the values of line 0 and line 1 of the even field. Then, line 3 of the scaled field is mapped from line 1 of the even field. In this manner, the larger scaled field is determined from the even field, without reference to any value of the odd field (except perhaps at the boundary). Only the scan lines of the even field and the values interpolated therebetween determine the scaled field lines. Generally, all of the even field lines and none of the odd field lines are used, and are mapped directly to particular lines of the scaled field, and additional scaled lines are thus determined by interpolation. It will also be apparent that any of a variety of interpolation schemes can be used. Although not shown, horizontal enlargement or shrinking of the image may be accomplished simultaneously.

It is important to recognize that only one of the methods described with reference to FIGS. 6A and 6B (that is, either the method of FIG. 6A or the method of FIG. 6B) is performed at any one time. There is no attempt to enmesh the two fields together.

Figure 7:
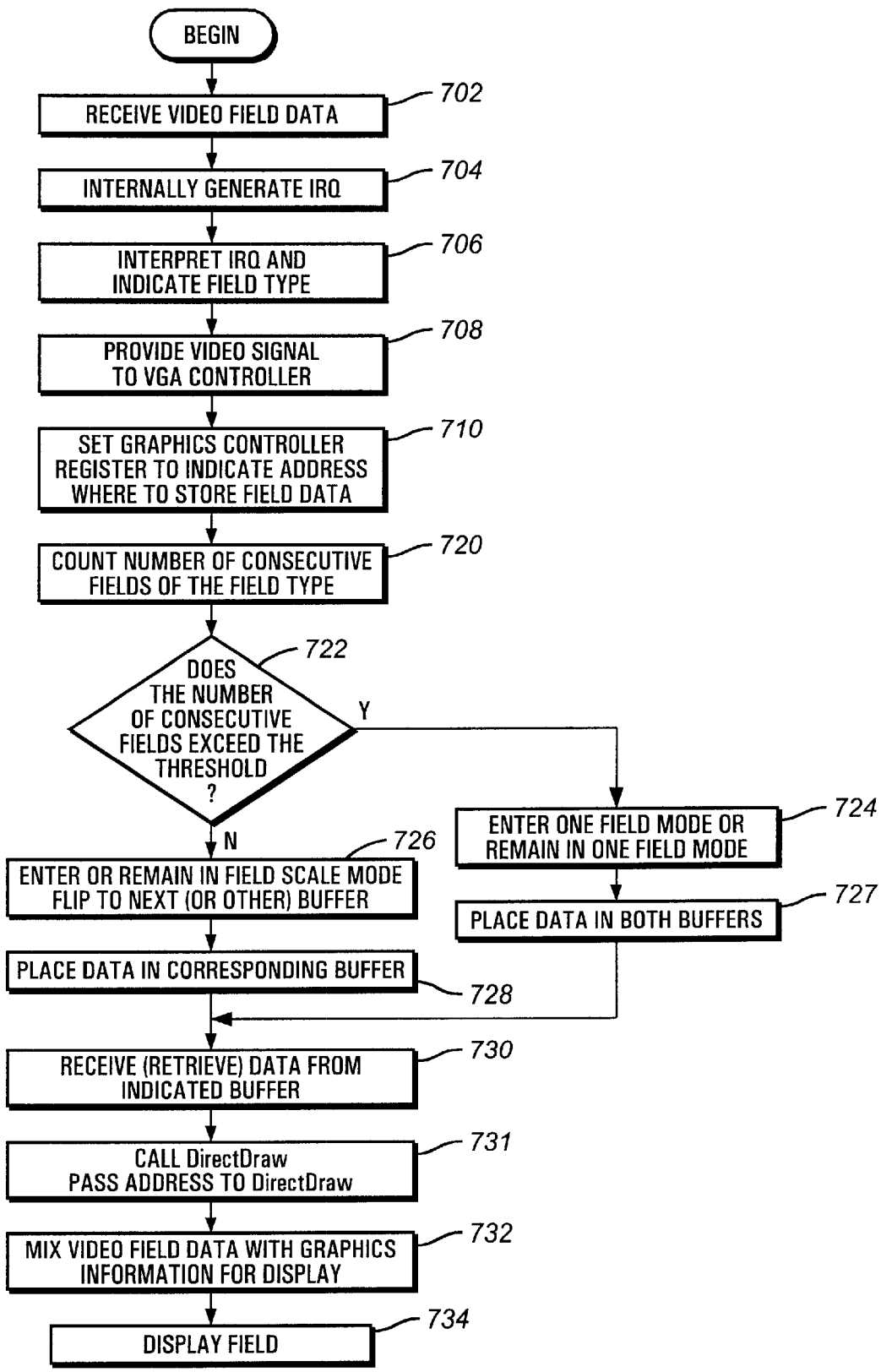
FIG. 7 shows one method according to the present invention.
Figure 8:
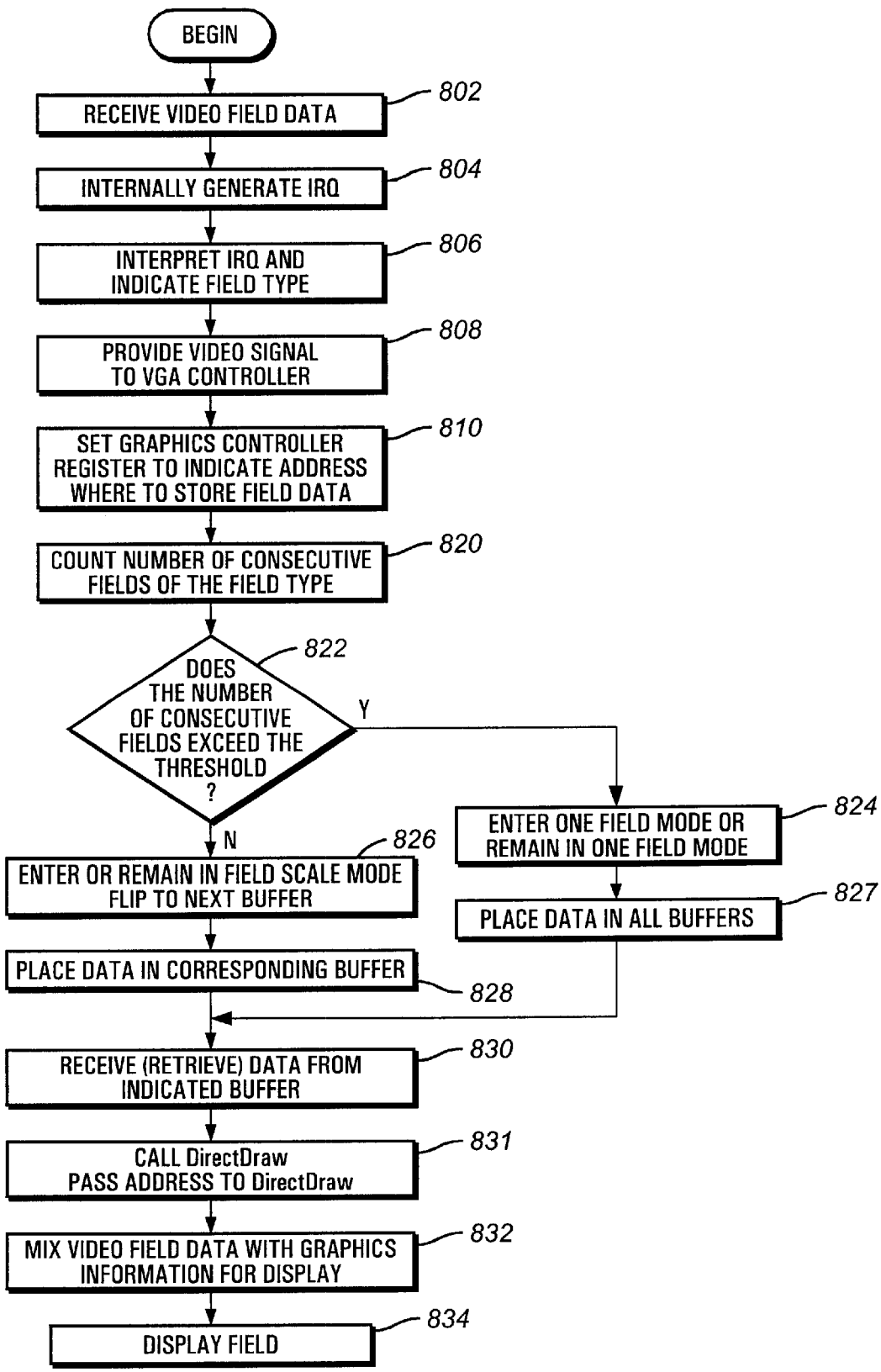
FIG. 8 shows a second method of the present invention.

Referring now to FIG. 7, one method according to one embodiment of the present invention is shown. At step 702, an input video field in YUV space is received at a video port to the VGA subsystem. At step 704, the video port provides an interrupt IRQ signal and a video signal. At step 706, the IRQ signal is interpreted by a VxD, indicating that a video field has been received at the video port and also indicates the field type, i.e., whether the field is an odd field or an even field. At step 708, the video port also provides a video signal directly to the VGA Controller. At step 710, the VxD identifies the arrival or end of a received video field to the VPM driver, and sets a register in the graphics controller corresponding to where to store the data corresponding to the video field. The VxD also identifies whether the input video signal received by the video port at that moment is an even field or an odd field and provides the identification to the VPM driver.

The VxD receives the addresses of the appropriate buffer from the VPM driver. At step 720, the VxD counts the number of consecutive fields of each type. The VxD also maintains a threshold value, a value that may be programmable. Different embodiments have different thresholds; in one embodiment, the threshold is 60 consecutive fields of the same type, either odd or even. At step 722, a comparison is made between the count of the number of consecutive fields of the present type, and the threshold. If the threshold is exceeded, for example if the number of consecutive fields of the present type is greater than 60, then at step 724 the VGA subsystem enters OneField Mode. If the field is of a different type from the preceding field, or if the number of consecutive fields of the present type is less than the threshold, at step 726 the VGA subsystem enters or remains in FieldScale Mode.

Many video sources have occasional glitches in which several fields of either odd or even type are provided consecutively. For example, if a television show breaks for or returns from a commercial, several fields of the same type may be provided consecutively. Therefore, a threshold is used to determine whether the video source is truly a single-type source, such as a video game, or a mere glitch that should not be the basis for a mode transition.

At step 726, when the VGA subsystem is in FieldScale mode, the VPM Driver commands "flipping" from one buffer to another when the IRQ signal is received. The pointer indicating the location in memory for storing the next field is flipped between the frontbuffer and the backbuffer when a new field is received by the input port, at the time the IRQ is generated. At steps 727 and 728, the data corresponding to the field is placed in a buffer or buffers. In the OneField mode either odd or even fields are directed to either buffer. At step 728, which is performed when the VGA subsystem is in FieldScale Mode, the data corresponding to the field is placed in the single buffer corresponding to the field type. Specifically, if the field is an odd field, then the field data are placed in the odd buffer. If the field is an even field, then the field data are placed in the even buffer. In this manner, in the FieldScale mode, received fields are placed alternately in the odd and even buffers. Therefore, all the odd fields are placed in one buffer and all the even fields are placed in the other buffer.

At step 730, the Graphics Controller receives the data from the buffers and determines the mode of the VGA subsystem. At step 731, the VPM Driver calls DirectDraw (initiating the DirectDraw Driver) in order to indicate which buffer to display, and where it should be displayed, and passes to DirectDraw the addresses of the buffer or buffers in the MDRAM 350 where the field data is stored. The output of the VPM Driver is provided to the DirectDraw Driver, which provides a signal to the VGA Controller. The DirectDraw Driver is used to make the graphics controller present data from the two buffers alternately on the display. There is no meshing of the images from one buffer with the images from the other buffer, except in the eye of the person viewing the image. Each field is scaled as described below in reference to FIGS. 6A and 6B.

At steps 732 and 734, the DirectDraw Driver causes the Graphics Controller to display the fields in an appropriate manner, and mixes video field data with graphics information for display. At step 732, the buffers are shown on the display without offset. Step 732 is performed when the VGA subsystem is in OneField mode. At step 734, the display of one of the fields has an offset of one scan line with respect to the other field. Step 734 is performed by the DirectDraw driver when the VGA subsystem is in FieldScale mode.

Because data from one field only is presented at any given moment in time, temporal data from different points in time are not mixed. Each field is received individually, and is displayed individually. As with standard video, motion is achieved in the eye of the viewer. The interpolation of the missing scan lines provided in the FieldScale algorithm of FIGS. 6A and 6B provides almost as good a resolution as would copying the missing scan lines from the alternate field, and eliminates the temporal artifacts of blurring and double imaging caused by mixing temporal data. Also, because the alternate field is flipped onto the field of view only 1/60th of a second later, the human eye provides a mixing of the interpolated scan line with the true data in the alternate field, substantially correcting for any loss of resolution.

In addition to a home theater, system, the present invention extends to other appliances. An appliance in the context of the present invention refers to an electric device having processor intelligence, a display screen, and a video card, wherein video data is displayed for information or entertainment purposes.

The foregoing disclosure and description of the invention are illustrative and explanatory thereof, and various changes in the details of the illustrated apparatus and construction and method of operation may be made without departing from the spirit of the invention.

We claim:

1. A video signal processing device comprising:

a video frame Input source;

a first buffer coupled to the video frame input source, the first buffer adapted to receive odd-numbered video lines from the video frame input, producing a first video frame independent of the even-numbered video lines;

a second buffer coupled to the video frame input source, the second buffer adapted to receive even-numbered video lines from the video frame input, producing a second video frame independent of the odd-numbered video lines; and a field scaler coupled to the first and the second buffers, adapted to produce an output video frame for a video display having a first size by second between the first video frame and the second video frame, the first video frame and the second video frame having a second size, wherein the field scaler produces the output video frame by copying the selected one of the first video frame and the second video frame to the video output frame unchanged if a ratio between the first size and the second size is below a predetermined value.

2. The video signal processing device of claim 1, wherein the video frame input source deinterlaces video input frames producing odd-numbered video lines and even-numbered video lines.

3. The video signal processing device of claim 1, wherein the field scaler produces the output video frame by alternately selecting the first video frame and the second video frame.

4. The video signal processing device of claim 1, wherein the field scaler duplicates successive lines of the selected one of the first video frame and the second video frame to produce the output video frame.

5. The video signal processing device of claim 1, wherein the field scaler interpolates between successive lines of the selected one of the first video frame and the second video frame to produce the output video frame.

6. The video signal processing device of claim 1, wherein if the field scaler selects the first video frame, a last line of the output video frame is produced by copying a last line of the first video frame.

7. The video signal processing device of claim 1, wherein the predetermined value is 1.5.

8. The video signal processing device of claim 1, wherein the field scaler is adapted to modify a horizontal size of the output video frame.

9. A video signal processing device comprising:

a video frame input source;

a first buffer coupled to the video frame input source, the first buffer adapted to receive odd-numbered video lines from the video frame input, producing a first video frame independent of the even-numbered video lines;

a second buffer coupled to the video frame input source, the second buffer adapted to receive even-numbered video lines from the video video frame input, producing a second video frame independent of the odd-numbered video lines; and a field scaler coupled to the first and the second buffers, adapted to produce an output video frame for a video display by selecting between the first video frame and the second video frame;

wherein if the field scaler selects the second video frame, a first line of the output video frame is inserted from a boundary line source that produces a black line.

10. A video signal processing device comprising:

a video frame input source;

a first buffer coupled to the video frame input source, the first buffer adapted to receive odd-numbered video lines from the video frame input, producing a first video frame independent of the even-numbered video lines;

a second buffer coupled to the video frame input source, the second buffer adapted to receive even-numbered video lines from the video frame input, producing a second video frame independent of the odd-numbered video lines; and a field scaler coupled to the first and the second buffers, adapted to produce an output video frame for a video display by selecting between the first video frame and the second video frame;

wherein if the field scaler selects the second video frame, a first line of the output video frame is inserted from a boundary line source that produces a line derived from a window background.

11. A video signal processing device comprising:

a video frame input source;

a first buffer coupled to the video frame input source, the first buffer adapted to receive odd-numbered video lines from the video frame input, producing a first video frame independent of the even-numbered video lines;

a second buffer coupled to the video frame input source, the second buffer adapted to receive even-numbered video lines from the video frame input, producing a second video frame independent of the odd-numbered video lines; and a field scaler coupled to the first and the second buffers, adapted to produce an output video frame for a video display by selecting between the first video frame and the second video frame;

wherein if the field scaler selects the second video frame, a first line of the output video frame is inserted from a boundary line source that produces a line copied from a first line of a previous odd-numbered field.

12. A computer system, comprising:

a processor;

a video signal processing device coupled to the processor, the video signal processing device comprising:

a video frame input source;

a first buffer coupled to the video frame input source, the first buffer adapted to receive odd-numbered video lines from the video frame input, producing a first video frame independent of the even-numbered video lines;

a second buffer coupled to the video frame input source, the second buffer adapted to receive even-numbered video lines from the video frame input, producing a second video frame independent of the odd-numbered video lines; and a field scaler coupled to the first and the second buffers, adapted to produce an output video frame for a video display by selecting between the first video frame and the second video frame; and a video display coupled to the video signal processing device adapted to display the output video frame:

wherein if the first video frame is empty, the field scaler always selects the second video frame, and wherein, if the second video frame is empty, the field scaler always selects the first video frame.

13. The computer system of claim 12, wherein the field scaler produces the output video frame by alternately selecting the first video frame and the second video frame.

14. The computer system of claim 12,
wherein the field scaler produces the output video frame by interlacing new lines created by interpolating between successive lines in the selected of the first video frame and the second video frame.

15. The computer system of claim 12,
wherein the field scaler produces the output video frame by interlacing new lines created by duplicating successive lines in the selected of the first video frame and the second video frame.

16. The computer system of claim 12,
wherein the video display has a first size,
wherein the first video frame and the second video frame have a second size, and
wherein the field scaler produces the output video frame by copying the selected of the first video frame and the second video frame to the output video frame unchanged if a ratio between the first size and the second size is below a predetermined value.

17. A method of converting interlaced video into progressive scan video, the method comprising the steps of:
creating a first progressive scan video frame from odd-numbered lines of an interlaced video frame independent of even-numbered lines of the interlaced video frame; and
creating a second progressive scan video frame from even-numbered lines of an interlaced video frame independent of odd-numbered lines of the interlaced video frame;
scaling the first progressive scan video frame to a predetermined display size, independent of the first progressive scan video frame; and
scaling the first progressive scan video frame to a predetermined display size, independent of the second progressive scan video frame; and
wherein the step of scaling the first progressive scan video frame and the step of scaling the second progressive scan video frame are bypassed depending on a video display size.

18. The method of claim 17, the step of creating the first progressive scan video frame comprises the step of:
duplicating successive lines of the first progressive scan video frame.

19. The method of claim 17, the step of creating the second progressive scan video frame comprises the step of:
duplicating successive lines of the second progressive scan video frame.

20. The method of claim 17, the step of creating the first progressive scan video frame comprising the step of:
interpolating between pairs of successive lines of the first progressive scan video frame.

21. The method of claim 17, the step of creating the second progressive scan video frame comprising the step of:
interpolating between pairs or successive lines of the second progressive scan video frame.

22. A method of converting interlaced video into progressive scan video, the method comprising the steps of:
creating a first progressive scan video frame from odd-numbered lines of an interlaced video frame independent of even-numbered lines of the interlaced video frame;
creating a second progressive scan video frame from even-numbered lines of an interlaced video frame independent of odd-numbered lines of the interlaced video frame
scaling the first progressive scan video frame to a predetermined display size, independent of the second progressive scan video frame; and
scaling the second progressive scan video frame to the predetermined display size independent of the first progressive scan video frame;
wherein the step of scaling the first progressive scan video frame and the step of scaling the second progressive scan video frame are bypassed depending on a ratio of a size of the first progressive scan video frame to the video display size.

23. A method of converting interlaced video into progressive scan video, the method comprising the steps of:
creating a first progressive scan video frame from odd-numbered lines of an interlaced video frame independent of even-numbered lines of the interlaced video frame;
creating a second progressive scan video frame from even-numbered lines of an interlaced video frame independent of odd-numbered lines of the interlaced video frame;
copying the first progressive scan video frame into the second progressive scan video frame if the second progressive scan video frame is empty; and
copying the second progressive scan video frame into the first progressive scan video frame if the first progressive scan video frame is empty.

* * * * *